Feb. 14, 1961  C. C. SINGLETERRY  2,971,435
FILM STRIP PROJECTOR
Filed Dec. 31, 1957
3 Sheets-Sheet 1
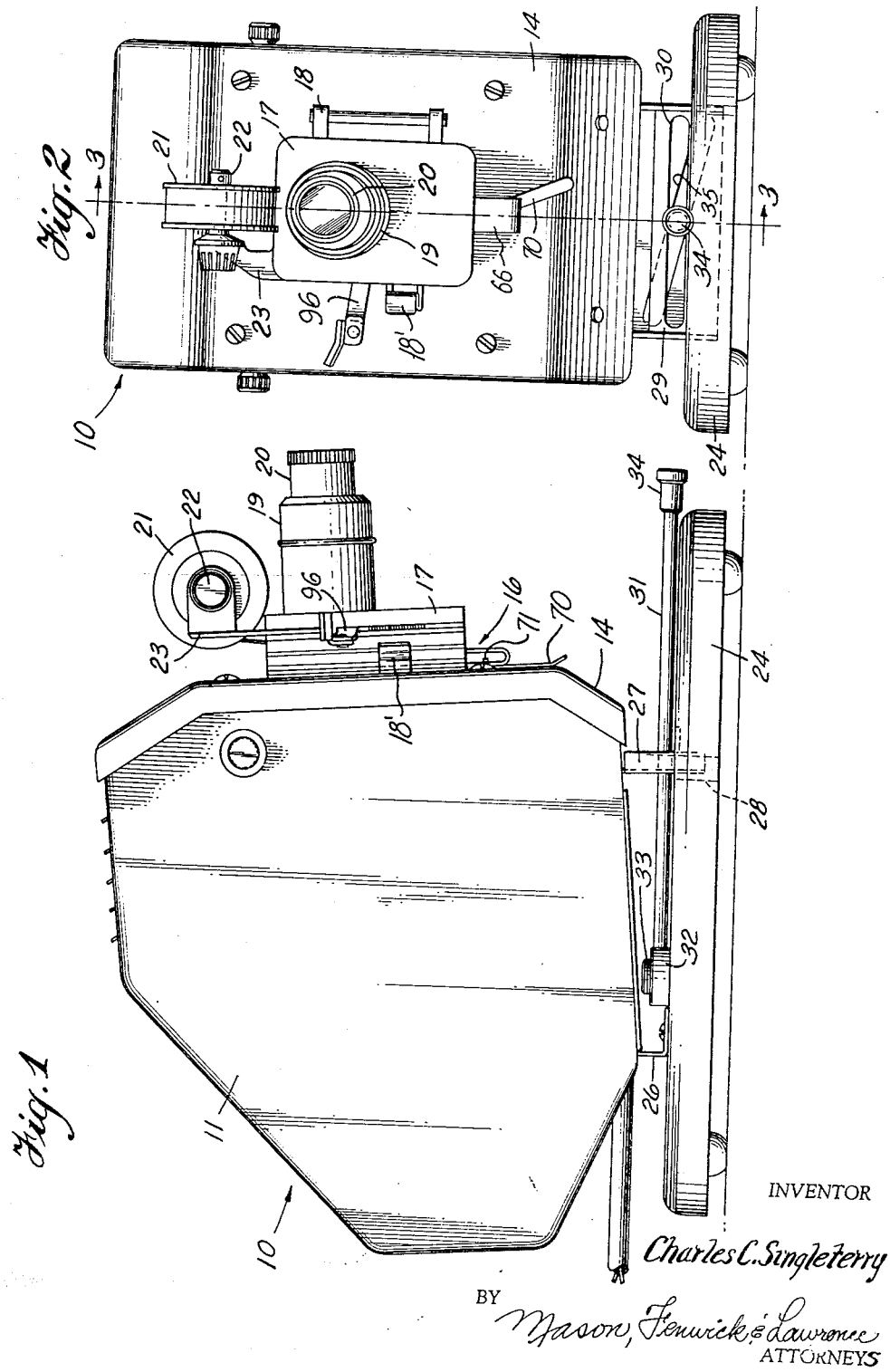
INVENTOR
Charles C. Singleterry
BY Mason, Fenwick & Lawrence
ATTORNEYS Feb. 14, 1961 C. C. SINGLETERRY 2,971,435
FILM STRIP PROJECTOR
Filed Dec. 31, 1957 3 Sheets-Sheet 2

INVENTOR
Charles C. Singleterry
BY Mason, Fenwick & Lawrence
ATTORNEYS

Feb. 14, 1961

C. C. SINGLETERRY 2,971,435

FILM STRIP PROJECTOR

Filed Dec. 31, 1957

INVENTOR
Charles C. Singleterry
BY
Mason, Fenwick & Lawrence
ATTORNEYS

United States Patent Office 2,971,435
Patented Feb. 14, 1961

2,971,435

FILM STRIP PROJECTOR

Charles C. Singleterry, Bethesda, Md., assignor to Classroom Film Strip and Projector Corporation, Arlington, Va., a corporation of Delaware Filed Dec. 31, 1957, Ser. No. 706,399

4 Claims. (Cl. 88—28)

The present invention relates in general to projectors, and more particularly to intermittently manually operated film strip projectors for projecting "still" pictures and to film advancing means therefor.

Intermittently manually operable film strip projectors have come into wide use in recent years as a classroom educational aid, to present educational information in connection with illustrated lectures and to provide wholly recorded instructional programs. The film employed in such projectors is of the marginally perforated type employed in motion picture projectors, and is advanced to register successive frames or images recorded on the film strip with the optical aperture of the projector by engagement of a reciprocative or rotatable claw or sprocket in the marginal perforations. The projectors when used in the classroom or as an educational facility are usually operated by persons who are not specially trained in their operation and under circumstances requiring that a minimum of attention be required in operating the projector. It is important therefore that projectors designed for this class of users be arranged to have an exceedingly simple and convenient operating procedure which effects successive advancement of the film strip without tearing of the film and insures precise registry of the image frames with the optical aperture.

Also, the greater illumination required to render film strip projectors suitable for such classroom or larger audience use has made it necessary to employ projector lamps of higher wattage than could be used in projectors designed primarily for home use. While projectors for home use employing low wattage lamps could be adequately ventilated by merely providing some ventilating openings in the lamp housing, the higher wattage projector lamps impose special problems of heat dissipation to avoid damage to the film or such distortion of the film at the film gate as would produce intolerable defocusing of the image.

An object of the present invention is the provision of a novel film strip projector of the type having an intermittently manually operable film feeding mechanism which is of simple, economical construction and durable and reliable in operation to precisely align the film strip frames with the optical aperture of the projector.

Another object of the present invention is the provision of a novel projector for marginally perforated film strips having a manually operable film feeding mechanism interfitting with the film perforations for intermittently advancing the film to precisely register successive film frames with the optical aperture, which minimizes damage to the film although manufactured within mass production tolerances.

Another object of the present invention is the provision of a novel projector for marginally perforated film strips having a manually operable film feeding mechanism for intermittently advancing the film which is self-indexing to properly register the film frames with the optical aperture regardless of the position of the marginal perforations when the film is initially introduced into the projector.

Another object of the present invention is the provision of a novel ventilating arrangement for film strip projectors.

Other objects, advantages and capabilities of the present invention will become apparent from the following detail description, taken in conjunction with the accompanying drawings illustrating one preferred embodiment of the invention.

In the drawings:

Figure 1 is a side elevation of a film strip projector embodying the present invention;

Figure 2 is a front elevation of the projector;

Figure 3:
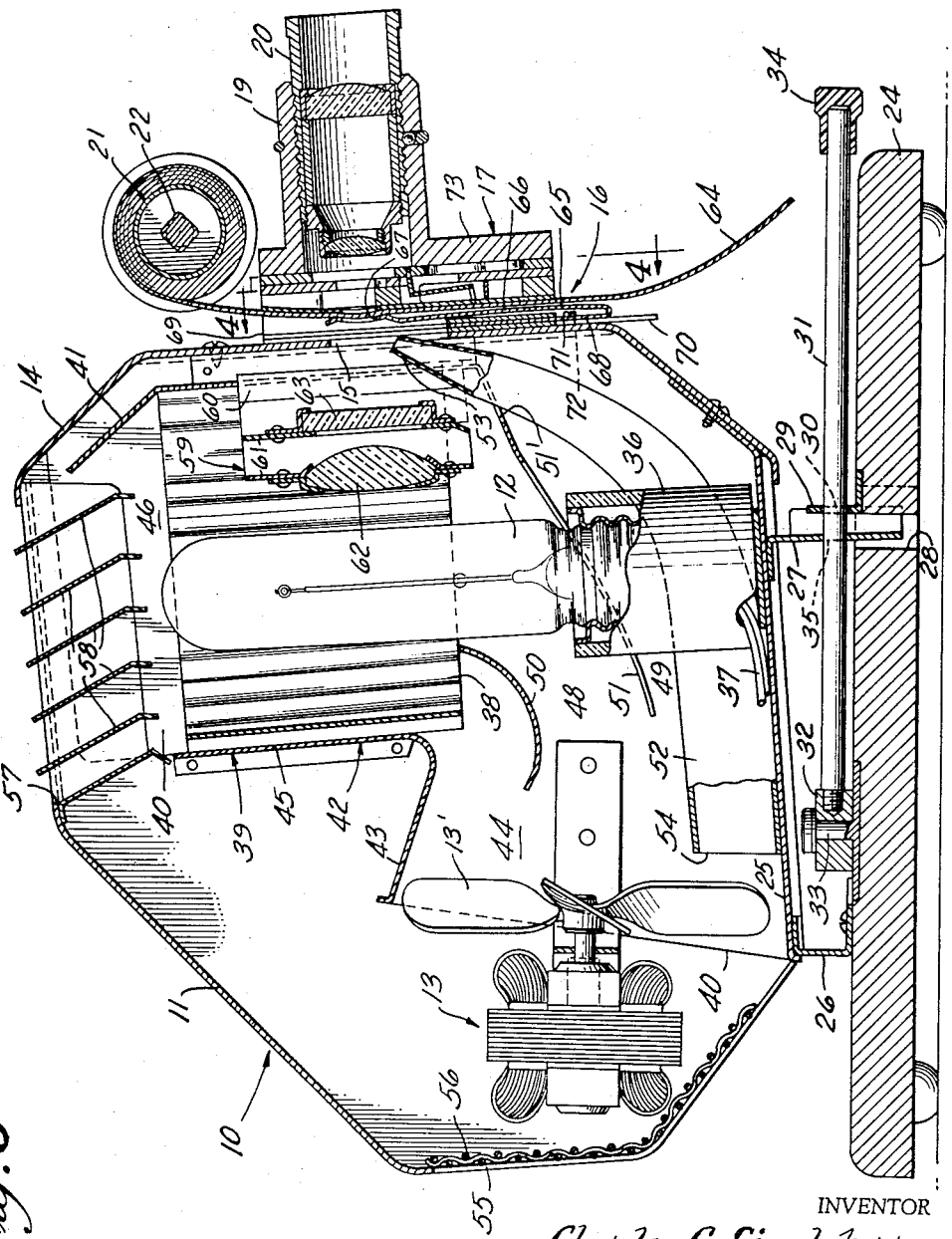
Figure 3 is a vertical longitudinal section view of the projector taken along the line 3—3 of Figure 2.
Figure 4:
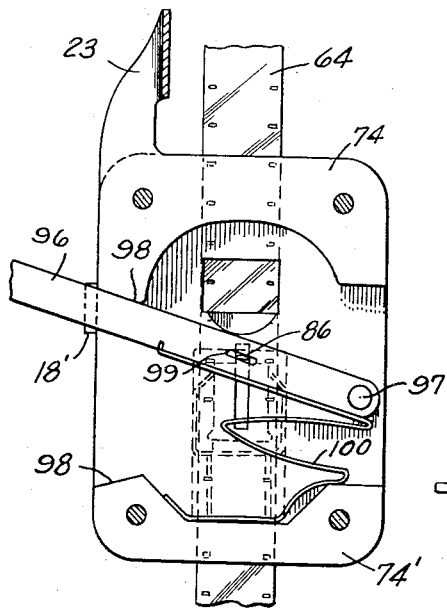
Figure 4 is a vertical transverse section view taken through the film feed mechanism housing along the line 4—4 of Figure 3, and illustrating the film feed mechanism in its normal position prior to commencement of a film feeding stroke of its operating cycle.
Figure 6:
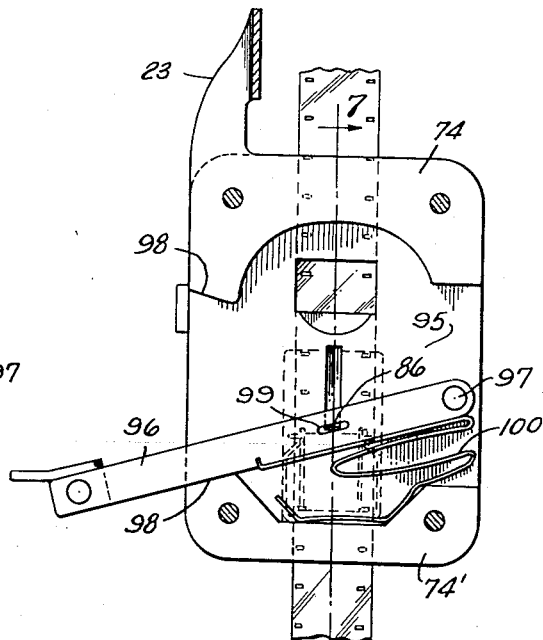
Figure 6 is a vertical transverse section view taken from the position of line 4—4 of Figure 3 and illustrating the film feed mechanism in the condition assumed thereby at the completion of a film advancing stroke.

Referring to the drawings, wherein like reference characters designate corresponding parts throughout the several figures, the projector embodying the present invention, indicated generally by the reference character 10, comprises an enlarged casing 11 forming the lamp housing for the projector lamp 12 and enclosing the motor-driven fan 13 and ventilating components thereof. There is removably secured to the front end of the lamp housing casing 11 a front cover plate 14 having a rectangular optical aperture 15 therein through which the beam of light originating at the lamp 12 is directed. A film gate, indicated generally by the reference character 16, is formed on the front cover plate immediately in front of the optical aperture 15 and includes a film advancing mechanism casing 17 hinged by the hinge assembly 18 to the front cover plate 14 for rotation about a vertical axis displaced laterally of the optical aperture 15 and releasably held in the position shown in Figs. 1–3 by a spring latch 18' coacting with a suitable tongue on the casing 17. There is integrally formed with the casing 17 a tubular lens mount 19 having an axially adjustable projector lens barrel 20 fitted therein. The hinged casing 17 also carries a film supply reel 21 removably fitted on a stub shaft 22 carried by an upwardly projecting arm 23 of the casing 17.

The projector lamp housing casing 11 and the components carried thereby are mounted for vertical tilting movement on the projector base 24. The projector casing 11 is provided with a metallic bottom plate 25 which is secured by screws or other suitable fastening means to the upper flange of a channel-shaped mounting bracket 26 affixed at its lowermost flange to the base 24, the channel 26 being of resiliently deformable sheet metal so that the casing 11 may be adjusted vertically about a horizontal axis disposed substantially at the juncture of the uppermost flange of the bracket 26 with its web. A rigid plate 27 depends from bottom plate 25 and is fixed thereto at a point spaced forwardly of the channel-shaped bracket 26 and projects into a suitable slot 28 formed in the base 24. An L-shaped plate 29 is provided with a horizontal flange which is affixed to the base 24 and an upstanding flange having a transverse horizontal slot 30 therein forming a guide slot for an elongated control rod 31 secured at its rearmost end to an annular fitting 32 journalled for rotation about a vertical pivot pin 33 fixed to the base 24. The control rod 31 is provided with a knob 34 projecting forwardly of the front end of the base 24 and is confined to rotary movement in a horizontal plane about the pivot pin 33 by the slot 30. It also projects through an elongated slot 35 in the depending plate 27 which is inclined to the axis of the slot 30 to elevate or lower the depending plate 27 and projector casing 11 about the channel-shaped bracket 26 in accordance with movement of the control rod 31 about the pivot pin 33.

The lamp 12 is supported within the lamp housing casing 11 in a conventional screw type lamp base 36 mounted on the housing bottom plate 25. A conventional electrical supply cord 37 having a switch therein is coupled to the socket terminals in the lamp base 36 to permit easy control of energization of the lamp 12. A substantially cylindrical heat dissipating shield 38 formed of corrugated sheet metal surrounds the lamp 12 in substantially concentric relation with the axis of the lamp and is supported by a frame 39 of metallic plates including vertical side plates, one of which is shown at 40 anchored to and rising from the bottom plate 25 and front and rear plates 41, 42, respectively, carried by and extending between the side plates. The rear plate 42 is provided with a rearwardly inclined, upwardly projecting portion 43 shaped to define, in cooperation with appropriately shaped rearwardly projecting portions of the side plates 40, a rearwardly opening mouth of an extension conduit 44 having rearwardly diverging sides and top walls terminating substantially at the plane of the blades 13' of the fan 13. The remaining portion of the rear plate 42 forms a substantially vertical wall portion 45 extending parallel to the front plate 41 and defining with the front plate 41 and side plates 40 a vertical stack 46 surrounding the lamp 12. The region within the plates 40, 41 and 42 is subdivided into ventilating chutes 47, 48 and 49 by the curved baffle plates 50 and 51. The baffle plate 50 is a curved plate extending transversely between the side plates 40 and form an upper ventilating chute opening toward the fan blades 13' adjacent the mouth of the conduit 44 to direct air about the upper surface portions of the lamp 12. The baffle plate 51 is bifurcated to provide legs extending laterally of the lamp base 36 and cooperates with the baffle plate 50 to define the intermediate chute 48 therebetween opening toward the mouth of the conduit 44 to direct air in a forwardly and upwardly inclined direction about the portions of the lamp 12 adjacent the base thereof. The baffle plate 51 also cooperates with the bottom plate 25 to define a lower chute 49 through which air is directed about the lamp base 36 and the opening 51' in the forward edge of the plate 51. An elongated, longitudinally curved funnel 52 also lies within the chute defined between the baffle plate 51 and bottom plate 25 and is provided with a restricted discharge opening 53 projecting into the aperture 15 in the cover plate 14, and an enlarged inlet opening 54 disposed adjacent the fan blades 13'. An air inlet opening 55 covered with a wire mesh grill 56 is provided in the rearmost portion of the casing 11 immediately behind the fan 13, and an air outlet opening 57 is provided in the top wall of the casing 11 at a location lying immediately above the upper end of the vertical stack 46 surrounding the projector lamp 12, the outlet opening 57 having a plurality of transverse inclined baffle plates extending through the opening to deflect the discharged air rearwardly of the projector.

A channel-shaped bracket 59 is located immediately forwardly of the projector lamp 12 and includes legs 60 which are fixed to the front plate 41 of the stack 46 and a pair of transverse, generally vertically arranged apertured webs 61 supporting a condensing lens 62 and a heat filter 63 in alignment with the optical axis of the projector. It will be noted from Figure 3 that the condensing lens 62 and heat filter 63 are located in the path of air forced through the intermediate ventilating chute 48 and this location of these elements coupled with the open construction of the supporting bracket 59 therefor facilitates effective cooling of these components.

The film gate 16 disposed immediately forwardly of the cover plate 14 is formed of separable rear and front gate assemblies to embrace the film strip 64. The rearmost film gate assembly is fixed to the cover plate 14 and comprises an adjustable film framing member 65 in the form of a vertically slidable element having an elongated vertically extending front leg 66 terminating at its upper end in a rectangular aperture 67 for framing the picture image on the film 64 and having a recurved leg 68 which is shorter than the front leg 66 rising in substantial parallelism with the leg 66. The short leg 68 is slidably received in a vertical guideway provided in a mounting plate 69 which is fixed to the cover plate 14 which is of substantially rectangular outline conforming to the outline of the film advancing mechanism casing 17 and is relieved in the region of the aperture 15 in the cover plate 14. A lever 70 is pivoted to the cover plate 14 between the short leg 68 of the framing member 65 and the cover plate 14 and is provided with an integral pin 71 which is located eccentrically relative to the pivot of the lever 70 and projects into a transverse slot 72 in the short leg 68 of the framing member 65. Thus, upon rotation of the lever 70, the framing member 65 will be adjusted vertically to properly frame the picture image on the film strip 64. A tight fit is provided between the relatively slidable elements so that the framing member 65 will be frictionally retained in the various positions of adjustment in which it is left.

Figure 5:
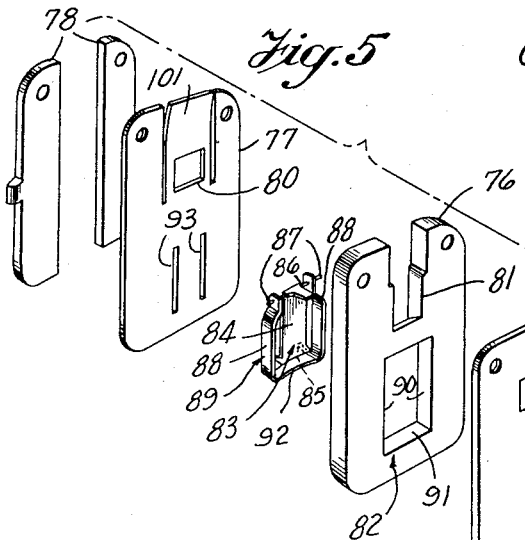
Figure 5 is an exploded perspective view of the components of the film feeding housing and film gate.
Figure 7:
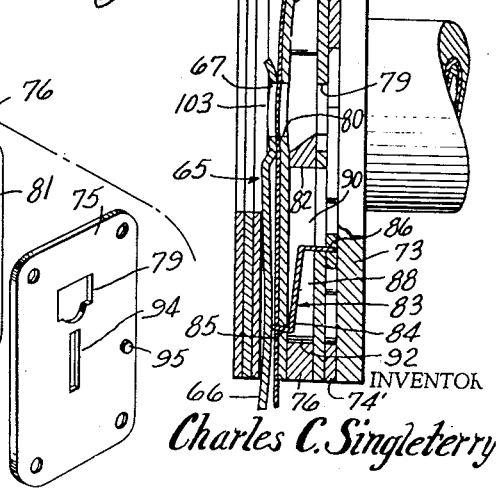
Figure 7 is a fragmentary vertical section view taken along the line 7—7 of Figure 6.

The film advancing mechanism casing 17 which also houses the forward film gate assembly is assembled from components which are more clearly revealed in the exploded view of Figure 5, and the enlarged section view of Figure 7. The casing 17 comprises a front wall 73 from which the integrally formed lens mount 19 projects, into which lens barrel 20 is telescopically projected, and forms the supporting member for the remaining components of the film advancing mechanism and forward film gate section. In successive layers progressing rearwardly of the front wall 73, the front wall 73 carries a pair of vertically spaced plate segments 74, 74' of equal thickness lying in a single plane and mounted directly on the rear surface of the wall 73, a forward retaining plate 75, a claw guide plate 76, a rear retaining plate 77, and a laterally spaced pair of guide strips 78 defining between them a vertical guideway for the film strip 64. The two retaining plates 75, 77 are each provided with rectangular apertures 79, 80 aligned with the optical axis of the projector and with the apertures 67 and 15, and the claw guide plate 76 is provided with an opening 81 which opens through the top of the plate 76 and has a lower portion which conforms substantially to the apertures 79 and 80 and is aligned therewith, and an enlarged upper portion. The claw guide plate 76 also has a rectangular guideway 82 therein. Enclosed within the guideway 82 is a film feeding claw and the carriage assembly formed of a bell crank claw member 83 stamped from a strip of sheet metal having a claw arm 84 which terminates at its lower end in a pair of spaced claw points 85 spaced laterally an appropriate distance to register with the marginal perforations on the opposite sides of the film strip 64, and an actuating arm 86 projecting forwardly of the projector at right angles to the claw arm 84. Integral trunnions 87 project laterally in opposite directions from the bend in the bell crank claw member 83 and are pivotally received in apertures provided at the free ends of legs 88 of an upwardly opening U-shaped slide carriage 89 formed of flat spring metal. The upper terminal portions of the legs 88 are bent inwardly slightly from the planes of the legs 88, and the remaining portions of the legs 88 are spaced to slide along and be guided by the surfaces 90 of the claw guide plate 76 bounding the guideway 82.

The transverse lower surface 91 of the guideway 82 forms a lower limit stop for the carriage 89 when it is engaged by portions of the web 92 immediately adjacent and connected to the legs 88. It will be observed from Figure 5 that this transverse web 92 of the carriage 89 is bowed upwardly slightly at its center to impart additional resilience to the carriage.

The rear retaining plate 77 is provided with a pair of laterally spaced vertical slots 93 through which the claw points 85 are projected to engage the marginal perforations of the film strip 64, and the front retaining plate 75 is provided with a vertical slot 94 through which the actuating arm 86 of the bell crank claw member 83 projects into a space 95 defined between the plate segments 74, 74', the retaining plate 75, and the rear surface of the wall 73. The bell crank claw member 83 is actuated by means of a film advancing lever 96 pivoted by the stud 97 to the front retaining plate 75 and projecting between limit shoulders 98 on the plate segments 74, 74' to an exposed position laterally of the housing 17. The lever 96 has a slot 99 therein into which the actuating arm 86 of the bell crank claw member 83 projects. A return spring 100 in the shape of a distorted W has one leg underlying the lever 96 and another leg thereof seated in a concave upwardly facing surface of the plate segment 74' to continuously urge the lever 96 against the uppermost stop shoulder 98.

The portions of the rear retaining plate 77 lying within the film guideway defined between the guide strips 78 and above the lower edge of the aperture 80 form a strip portion 101 which is deformed slightly out of the plane of the plate 77 to provide a rearwardly facing convex surface indicated at 102 cooperating with a forward concavely curved surface of the curved portion 103 of the film framing member 65 in the region of the aperture 67 to define a curved film guideway at the optical aperture which deforms the center of the picture image about 0.005 inch rearwardly of the plane of the edges of the image to reduce spherical aberration in the projected image of the marginal portions of the image frame. The upper free end region of the portion 101 is also curved forwardly of the plane of the plate 77 to provide an enlarged entrance end for the film guideway.

In the operation of the projector, the film strip 64 wound upon a suitable reel is fitted onto the stub shaft 22, and the film strip is threaded downwardly into the guideway formed between the strips 78, the retaining plate 77, and the film framing member 65 until the leading edge of the film is positioned adjacent or immediately below the lower end of the film gate 16. The free end of the film feeding lever 96 is then forced downwardly to the lower limit of its travel. This downward movement of the lever 96 first imparts clockwise rotation to the bell crank claw member 83 about its trunnions 87, as viewed in Figures 3 and 7, through the interaction of the walls of the slot 99 on the lever 96 with the actuating arm 86. Clockwise movement of the claw member 83 continues until the claw points 85 are fully projected into the marginal perforations of the film strip 64 and the rearmost ends of the claw points 85 either engage the forward surface of the mounting plate 69 or the surface of the film strip in the film guideway. In either case, further clockwise rotation of the bell crank claw member 83 is resisted and the remainder of the downward stroke of the lever 96 is effective to translate the carriage 89 and the bell crank claw member 83 downwardly until either the carriage strikes the lower surface 91 of the guideway 82 or the lever 96 strikes the lower stop surface 98. If the claw points 85 do not register with the marginal perforations of the film strip 64, upon initial clockwise rotation of the claw member 83, as may occur upon first manipulation of the lever 96 after film is fed into the film gate, engagement of the free ends of the claw points 85 with the film strip 64 will occur upon very slight downward movement of the lever 96 and the resistance to rotation thus produced will effect immediate translation of the carriage 89 and claw member 83 downwardly until the claw points reach the marginal perforations of the film. The further downward movement of the lever 96 effects projection of the claw points 85 into the marginal perforations and then further downward translation of the carriage 89 to register an image frame with the optical axis of the projector. In this way, the feed mechanism is self-indexing.

Upon release of the film feeding lever 96, the return spring rotates the lever 96 upwardly about the pivot 97 until it strikes the upper stop surface 98. During the initial portion of this upward rotation of the lever 96, the bounding walls of the slot 99 urge the actuating arm 86 of the claw member 83 upwardly to pivot the claw member 83 in a counterclockwise direction about its trunnions 87, fully withdrawing the claw 85 from the marginal perforations in the film strip 64 to the position illustrated in Figure 3, whereupon the lower edge of the claw arm 84 engages the rear surface of the front retaining plate 75 and further upward movement of the lever 96 effects upward translation of the carriage 89 and claw member 83 to its initial position. By this construction, the claw points are fully withdrawn from the plane of the film guide during return movement of the carriage 89 and claw member 83 to minimize tearing of the marginal portions of the film or upward displacement of the film such as would produce misalignment of the image frame with the optical axis. If the film binds in the guideway during the feeding stroke of the claw member 83, the carriage 89, which is of highly resilient, thin spring metal, yields readily to minimize tearing of the thin portions of the film lying between successive marginal perforations.

The motor of the fan 13 is interposed in the energizing circuit of the lamp 12 so that the fan is placed in operation whenever the lamp 12 is illuminated. By the particular arrangement of baffles or partitions within the casing 11, one separate column of air is directed against the upper portion of the lamp 12, another column of air is directed against the lower regions of the globe of the lamp 12, the condensing lens 62 and the heat filter 63, and another column of air is directed against the base of the lamp 12. Additionally, a rapidly moving stream of air is directed by the funnel 52 through the aperture 15 in the cover plate 14 and against the portion of the film strip 64 interposed in the optical axis of the projector to minimize thermal damage to the film resulting from high wattage projector lamps required for classroom and other larger audience uses of the projector. Air forced through the lower chute 49 is also conducted through the opening 51' in the baffle plate 51 and along the front surface of the filter 63.

While only one preferred embodiment of the invention has been particularly shown and described, it is apparent that other modifications may be made in the invention without departing from the spirit and scope thereof, and it is desired, therefore, that only such limitations shall be placed thereon as are imposed by the prior art and are set forth in the appended claims.

I claim:

1. In a projector for marginally perforated film strips, film gate means defining an elongated film guideway for guiding the film strip longitudinally along a substantial vertical axis past the optical aperture of the projector, a film advancing mechanism positioned adjacent said guideway comprising an upwardly opening, U-shaped resiliently deformable carriage formed of a strip of flat spring metal bent to provide a transverse web portion and laterally spaced upwardly extending legs, means forming a guide chamber including a pair of laterally spaced vertical guide surfaces abutting the oppositely extending surfaces of the legs of said carriage for guiding the same in a rectilinear vertical path lying wholly below the optical axis of the projector, front and rear walls bounding said guide chamber for restraining said carriage against tilting movement therein a bell crank claw member pivotally coupled to the upper end portions of said carriage legs and supported therebetween for pivotal movement about a horizontal axis paralleling the plane of the film guideway and including a depending arm having a pair of claw points at the lower end thereof extending toward the guideway and an actuating arm angularly related to said depending arm, a manually operable lever supported for pivotal movement in a vertical plane and having a slot accommodating said actuating arm of said bell crank member to pivot the bell crank member in a direction approaching the film guideway on downward movement of the lever to project said claw points into the film perforations and in a direction receding from the film guideway on upward movement of the lever to withdraw the points from the guideway, a return spring for said lever for urging the same to its uppermost position, said film gate means including a plate member rearwardly bounding the film guideway providing a surface in said film guideway in the path of movement of said claw points limiting pivotal movement of the claw member in a film approaching direction to cause downward translatory movement of said carriage member during the terminal portion of the downward stroke of said lever, and stop means positioned in the path of downward movement of said carriage to abut the web thereof when said claw points reach a preselected position registering an image frame on the film strip with the optical axis of the projector, and said front wall of said guide chamber being positioned to be engaged by said depending arm upon preselected pivotal movement of said bell crank member withdrawing the same from said guideway to effect upward translatory movement of said carriage member and bell crank member.

2. In a projector for marginally perforated film strips, film gate means defining an elongated film guideway for guiding the film strip longitudinally along a substantially vertical axis past the optical aperture of the projector, a film advancing mechanism positioned adjacent said guideway comprising a substantially rectangular guide chamber lying wholly below the optical axis of the projector including a front wall, a slotted rear wall, a pair of laterally spaced vertical guide surfaces, an upwardly opening substantially U-shaped resiliently deformable carriage disposed within said guide chamber formed of a strip of flat spring metal bent to provide a transverse web portion and laterally spaced upwardly extending legs resiliently urged into sliding frictional contact with said vertical guide surfaces, a bell crank claw member pivotally coupled to the upper end portions of said legs and supported therebetween for pivotal movement about a horizontal axis paralleling the plane of the film guideway and including a depending arm terminating at its lower end in a pair of claw points extendible through the slots of said rear wall to simultaneously engage a transversely aligned pair of marginal perforations of the film strip and an actuating arm angularly related to said depending arm, a manually operable lever pivotally supported for vertical movement intercoupled with said actuating arm for pivoting the claw member in a direction approaching the film guideway during an initial portion of downward movement of said lever to project said claw points into the film perforations and in a direction receding from the film guideway during an initial portion of upward movement of the lever to withdraw the claw points from the guideway, said film gate means including a rear plate having a slide surface below the optical axis of the projector and in the path of movement of the claw points limiting pivotal movement of the claw member in a film approaching direction to cause downward translatory movement of said carriage during the terminal portion of the downward stroke of said lever, and said front wall of said guide chamber being positioned to abut the lower end of said depending arm of said claw member upon preselected receding pivotal movement of the claw member from said guideway to limit receding movement thereof and effect upward translatory movement of said carriage and claw member during the terminal portion of the upward stroke of said lever.

3. In a projector for marginally perforated film strips, a pair of laterally spaced parallel strip members and a carrier therefor defining an elongated film guideway for guiding the film strip longitudinally along a substantially vertical axis past the optical aperture of the projector, a film advancing mechanism positioned adjacent said guideway comprising a guide plate affixed to said carrier plate and having a substantially rectangular guide chamber therein lying wholly below the optical axis of the projector bounded by a pair of laterally spaced vertical guide surfaces and a front wall, said carrier plate forming a rear wall for said guide chamber and having vertically extending slots therein positioned to be aligned with the marginal perforations in the film strips, an upwardly opening substantially U-shaped resiliently deformable carriage disposed within said guide chamber formed of a strip of flat spring metal bent to provide a transverse web portion and laterally spaced upwardly extending legs resiliently urged into sliding frictional contact with said vertical guide surfaces, said legs terminating at their upper ends in inwardly off-set terminal leg portions connected to said legs by inwardly bent portions, a bell crank claw member pivotally coupled to said terminal leg portion and supported therebetween for pivotal movement about a horizontal axis paralleling the plane of the film guideway and including a depending arm terminating at its lower end in a pair of claw points extendible through the slots of said carrier plate to simultaneously engage a transversely aligned pair of marginal perforations of the film strip and an actuating arm angularly related to said depending arm, a manually operable lever pivotally supported for vertical movement intercoupled with said actuating arm for pivoting the claw member in a direction approaching the film guideway during an initial portion of downward movement of said lever to project said claw points into the film perforations and in a direction receding from the film guideway during an initial portion of upward movement of the lever to withdraw the claw points from the guideway, a plate member bounding said film guideway along the opposite side thereof from said carrier plate having a slide surface below the optical axis of the projector and in the path of movement of the claw points limiting pivotal movement of the claw member in a film approaching direction to cause downward translatory movement of said carriage member during the terminal portion of the downward stroke of said lever, said front wall of said guide chamber being disposed in the path of the lower end of said depending arm to limit receding pivotal movement of the claw member from the guideway to effect upward translatory movement of said carriage and claw member during the terminal portion of the upward stroke of said lever, said carriage being resiliently deformable in response to a selected force on said claw points resisting movement thereof in a film advancing direction to urge said legs with greater force against said guide surfaces and increase frictional contact therebetween.

4. In a projector for marginally perforated film strips, a pair of laterally spaced parallel strip members and a carrier therefor defining an elongated film guideway for guiding the film strip longitudinally along a substantially vertical axis past the optical aperture of the projector, a film advancing mechanism positioned adjacent said guideway comprising a guide plate affixed to said carrier plate and having a substantially rectangular guide chamber therein lying wholly below the optical axis of the projector bounded by a pair of laterally spaced vertical guide surfaces, a bottom wall forming a horizontal transverse stop surface, and a front wall, said carrier plate forming a rear wall for said guide chamber and having vertically extending slots therein positioned to be aligned with the marginal perforations in the film strips, an upwardly opening substantially U-shaped resiliently deformable carriage disposed within said guide chamber formed of a strip of flat spring metal bent to provide an upwardly bowed transverse web portion and laterally spaced upwardly extending legs resiliently urged into sliding frictional contact with said vertical guide surfaces, said legs terminating at their upper ends in inwardly off-set terminal leg portions connected to said legs by inwardly bent portions, a bell crank claw member pivotally coupled to said terminal leg portion and supported therebetween for pivotal movement about a horizontal axis paralleling the plane of the film guideway and including a depending arm terminating at its lower end in a pair of claw points extendible through the slots of said carrier plate to simultaneously engage a transversely aligned pair of marginal perforations of the film strip and an actuating arm angularly related to said depending arm, a manually operable lever pivotally supported for vertical movement intercoupled with said actuating arm for pivoting the claw member in a direction approaching the film guideway during an initial portion of downward movement of said lever to project said claw points into the film perforations and in a direction receding from the film guideway during an initial portion of upward movement of the lever to withdraw the claw points from the guideway, a plate member bounding said film guideway along the opposite side thereof from said carrier plate having a slide surface below the optical axis of the projector and in the path of movement of the claw points limiting pivotal movement of the claw member in a film approaching direction to cause downward translatory movement of said carriage member during the terminal portion of the downward stroke of said lever, said stop surface of said guide chamber being disposed to be abutted by the bowed web portion of said carriage to limit travel thereof in a film advancing direction, said front wall of said guide chamber being disposed in the path of the lower end of said depending arm to limit receding pivotal movement of the claw member from the guideway to effect upward translatory movement of said carriage and claw member during the terminal portion of the upward stroke of said lever, and said carriage being resiliently deformable in response to a selected force on said claw points resisting movement thereof in a film advancing direction to urge said legs with greater force against said guide surfaces and increase frictional contact therebetween.

References Cited in the file of this patent
UNITED STATES PATENTS

| | | |
|---|---|---|
| 1,427,575 | Brenkert et al. | Aug. 29, 1922 |
| 1,921,214 | Carpenter | Aug. 8, 1933 |
| 1,981,033 | Dina | Nov. 20, 1934 |
| 2,269,794 | Stechbart | Jan. 13, 1942 |
| 2,614,456 | Zeuthen | Oct. 21, 1952 |
| 2,661,656 | Bangsbergh | Dec. 8, 1953 |
| 2,790,349 | Hauser | Apr. 30, 1957 |